Feb. 22, 1949.  G. R. GEHRANDT  2,462,092
OPPOSED PISTON ENGINE
Filed Jan. 26, 1945  3 Sheets-Sheet 1
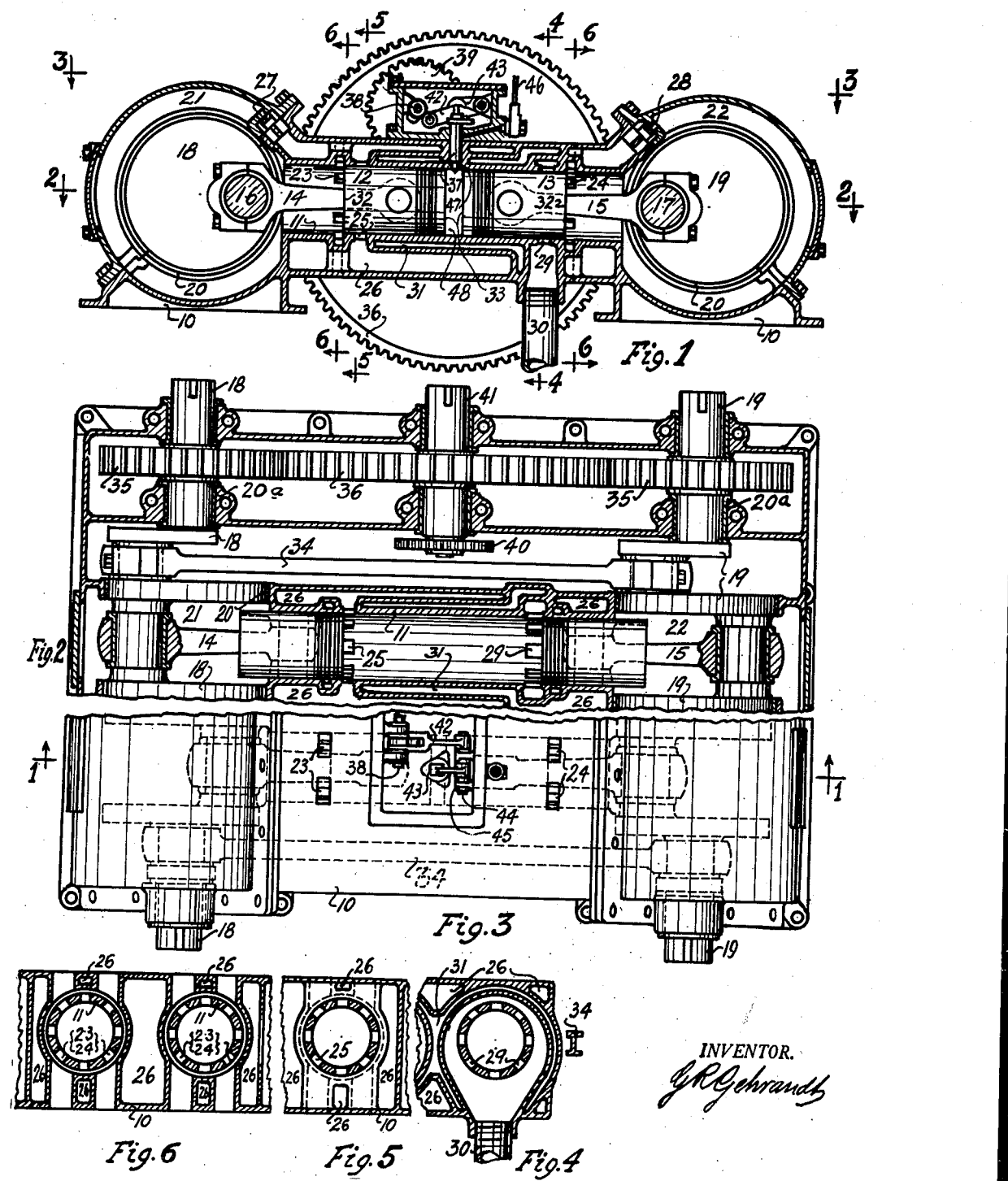
INVENTOR.
J. R. Gehrandt

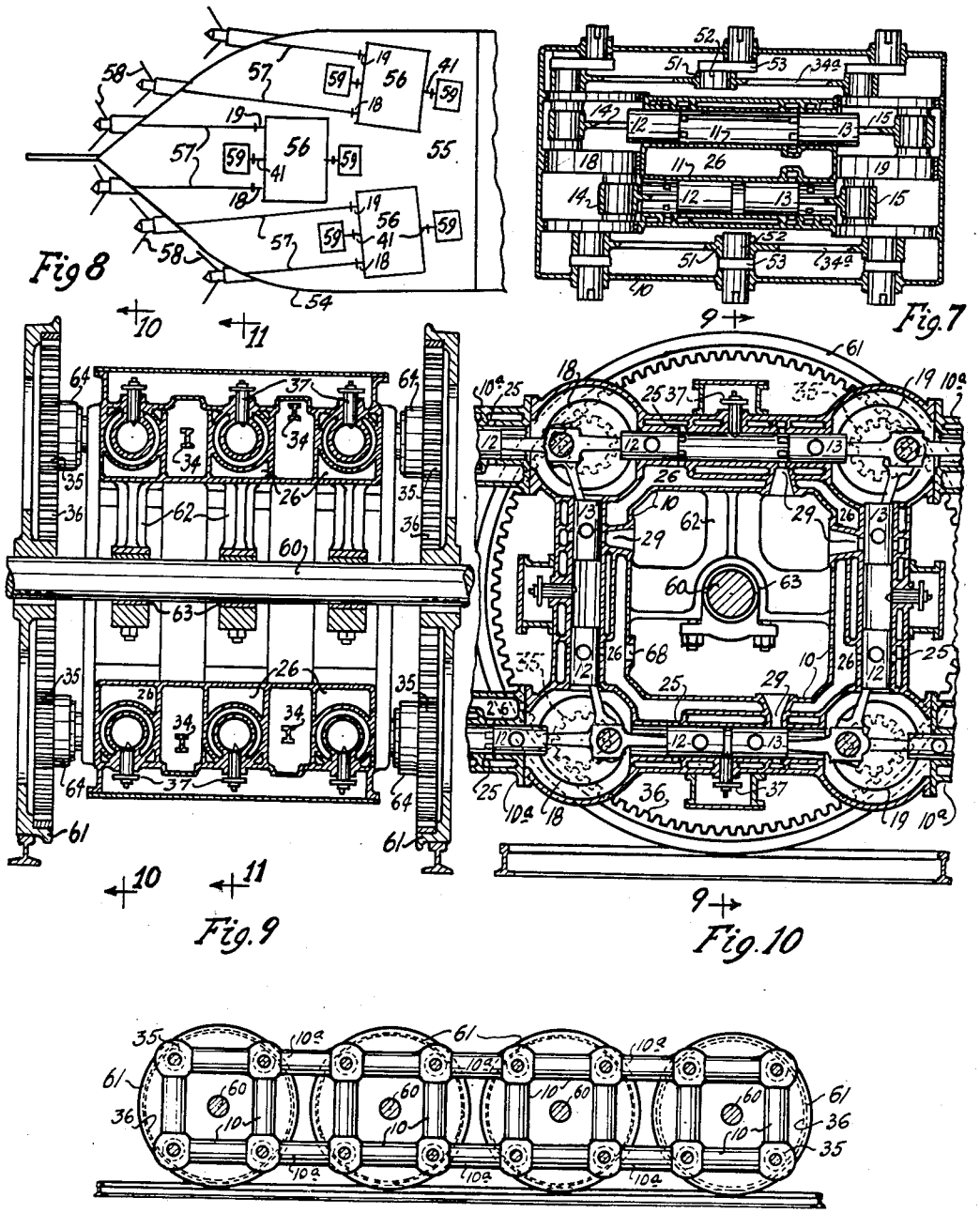

INVENTOR.
G. R. Gehrandt

Patented Feb. 22, 1949

2,462,092

UNITED STATES PATENT OFFICE 2,462,092

OPPOSED PISTON ENGINE

Gustav R. Gehrandt, Evanston, Ill.

Application January 26, 1945, Serial No. 574,713

28 Claims. (Cl. 123—51)

This invention relates, in general, to internal combustion engines, but more particularly to engines having opposing pistons; i. e., engines with power pistons working in one cylinder in directions towards and away from each other. The principles involved in this invention are equally adaptable, with only slight variations, to two-cycle and four-cycle engines, to engines of the Diesel type, and also to engines taking in a ready mixture of gas and air for combustion, such as blast furnace gas, coke oven gas, producer gas, illuminating gas, mixtures of air and vapors of carbureted volatile liquid fuels.

This invention also is an elaboration and further development of opposed piston engines and also of applicant's prior Patent No. 2,129,172, issued September 6, 1938.

In order to adapt this type of engine for high speed work, and thereby increase the power output of the engine per piston displacement unit, it is necessary to construct the engine, and particularly the moving parts thereof, as light as possible, and furthermore it is very essential that the engine be completely balanced in every respect.

It is one of the objects of the present invention to provide an improved, compact and self-contained engine with a minimum amount of accessories mounted on the outside of the engine.

Another object of the invention is to increase the specific output of the engine; i. e., the amount of horse power obtainable per piston displacement unit.

It is another object of the invention to provide a simple method of controlling the pressure of the scavenging and combustion air and thereby control the power output of the engine.

It is a further object of the invention to improve the mechanical as well as thermal efficiency of the engine and to simplify the design thereof, reducing the cost of manufacture.

Another object of the invention is to completely balance the engine statically as well as dynamically.

A still further object of the invention is to provide a simple means of supercharging the engine.

Another object of the present invention is to provide an engine of the greatest adaptability as to furnishing and simultaneously taking off of power, by the greatest number of different power take-offs at various locations and for various purposes.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which:

Figure 1 is a vertical, longitudinal, sectional view of an engine of this character, constructed in accordance with the principles of this invention, with parts broken away and parts omitted.

Figure 2 is a detail, horizontal, sectional view taken on lines 2—2, Figure 1, with parts omitted.

Figure 3 is a detail, horizontal view taken on line 3—3, Figure 1, with parts omitted.

Figure 4 is a vertical, sectional view on line 4—4, Figure 1, with parts omitted.

Figure 5 is a vertical, sectional view on line 5—5, Figure 1, with parts omitted.

Figure 6 is a vertical, sectional view on line 6—6, Figure 1, with parts omitted.

Figure 7 is a horizontal, sectional view similar to Figure 2, with parts omitted and other parts added.

Figure 8 is a horizontal, diagrammatic view of an engine room of a boat, with three engines constructed in accordance with this invention, installed therein.

Figure 9 is a vertical, sectional view on line 9—9 of Figure 10, showing an engine constructed in accordance with the form shown in Figure 1, adapted for railroad purposes.

Figure 10 is a vertical, sectional view on line 10—10 of Figure 9, with parts omitted.

Figure 11 is a vertical, sectional view on line 11—11 of Figure 9, with parts omitted, showing an engine constructed as shown in Figure 10, applied to the four driving wheels of a locomotive.

Figures 12, 13, 14:
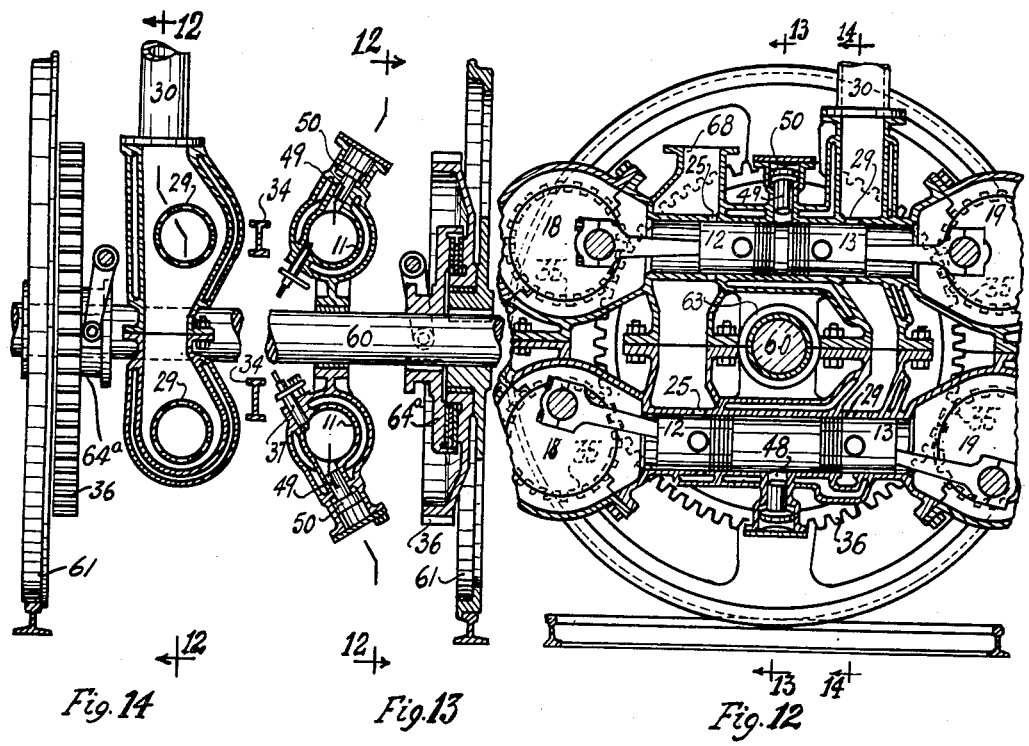
Figure 12 is a vertical, sectional view on lines 12—12 of Figures 13 and 14, with parts omitted.
Figure 13 is a vertical, sectional view on line 13—13 of Figure 12, with parts omitted.
Figure 14 is a vertical, sectional view on line 14—14 of Figure 12, with parts omitted.
Figures 15, 16:
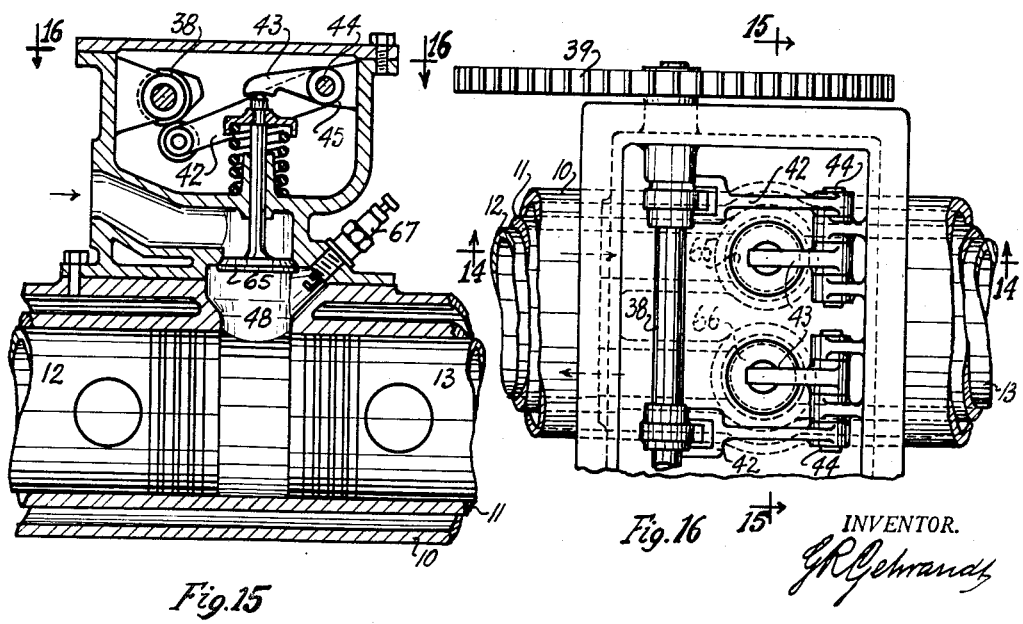
Figure 15 is a vertical, sectional view on line 15—15 of Figure 16, of another form of the invention, with parts omitted, and adapted for the four-cycle type of engine, and also for the use of different kinds of gas and air mixtures.
Figure 16 is a vertical, sectional view on line 16—16 of Figure 15, with parts omitted.

For purposes of illustration, a two-cycle engine of the Diesel type is shown in Figures 1–14, inclusive, while Figures 15 and 16 show the comparative ease required to adapt the invention for the four-cycle operation, and for a great number of different kinds of fuel.

Referring more particularly to the drawings, the numeral 10 designates the engine housing, having encased therein the power cylinders 11, in each of which cylinder pistons 12 and 13 reciprocate in directions towards and away from each other, and as the construction and operation of each cylinder with its pistons is the same, the description of one will apply equally as well to all of them.

Piston rods or links 14 and 15 connect pistons 12 and 13, respectively, with cranks 16 and 17, of crankshafts 18 and 19, which latter are mounted for rotation in suitable bearings 20 and 20a.

The outer ends of the piston rods 14 and 15, and the cranks 16 and 17, rotate respectively in crankcases 21 and 22 formed inside of engine housing 10.

The cylinders 11, near their outer ends, are respectively provided with inlet ports 23 and 24, open to the outside atmosphere, and also to the respective crankcases 21 and 22, through the cylinders, when pistons 12 and 13 are in their respective inner dead center positions, as shown in Fig. 1.

Adjacent to inlet ports 23, air ports 25 are provided connecting an air storage chamber 26 with crankcases 21 and 22 through inlet valves 27 and 28, to permit atmospheric air compressed by pistons 12 and 13, in the crankcases 21 and 22, to enter cylinder 11 between pistons 12 and 13.

The cylinder 11 is also provided with exhaust ports 29 spaced a considerable distance away from air ports 25, to permit the exit of the burnt gases from cylinder 11, through exhaust pipe 30, into a manifold (not shown), to the outside atmosphere.

A water jacket 31 may be provided to completely surround the cylinders 11, as well as the outlet ports 29, and part of the exhaust pipe 30.

The inlet ports 23 and 24 will be opened and closed by the outer ends 32 of pistons 12 and 13, when respectively approaching or moving away from the inner dead center position.

The compressed air inlet ports 25 will be opened and closed by the inner end 33 of piston 12, while the outlet ports 29 will be opened and closed by the inner end 33 of piston 13, when respectively approaching the outer dead center position or moving away from it.

In order to tie the two crankshafts 18 and 19 together, so that they will form one compact engine unit, connecting rods 34 are provided, and these rods will maintain the proper relationship in the motion of the pistons 12 and 13. While these connecting rods 34 may be used for taking off power at the ends of crankshafts 18 and 19, which latter may be provided with keyways for connecting flanges, as shown in Figs. 2, 3 and 7, if desirable, gears 35 and 36 may be provided, and such gears may serve not only as power take-offs, but they also provide a means for speed change purposes. It is to be understood, however, that the connecting rods 34 contribute greatly to a perfect balance of the moving masses of the engine.

The power fuel may be supplied through an injector 37, which latter may be connected, by means of a pipe 46, to the source of supply, the fuel nozzle of injector 37 discharging into the cylinder 11 between pistons 12 and 13 through a suitable opening 47.

The injector 37 may be operated by various means. For the sake of illustration, some of these means are shown in Figures 1, 3, 15 and 16, such as a camshaft 38, connected by gears 39 and 40 to a shaft 41. Camshaft 38 acts upon levers 42 and 43 secured on shaft 44, which in turn are pivoted at 45. Lever 43 operates injector 37 secured in opening 47 of cylinder 11, opening and closing it in predetermined positions.

The air storage chamber 26 may be equipped with all or a part of the control mechanism described in U. S. Patent 2,129,172, and in order to further control the combustion pressure, in case of supercharging between pistons 12 and 13, a combustion chamber of variable volume may be provided, which chamber may be constructed as shown in Figures 12 and 13. In this form of the invention, in the combustion chamber 48 there is provided a combined plunger 49 and piston 50, with means, preferably hydraulic pressure, acting above or below piston 50 to move the same, to vary the position of plunger 49 according to whatever pressure the combustion air in storage chamber 26 is under. In order to supply enough air for supercharging purposes, an air compressor of any construction, but preferably one of the rotating type of sufficient size, may be connected with one of the power take-offs, with a discharge directly into the air storage chamber 26, as shown in Figure 10 at 68.

Figures 7 through 16, inclusive, show the adaptability of the invention shown in Figures 1 through 6, inclusive.

In the form of the invention shown in Figure 7, the gears 35 and 36 have been omitted, and the power take-off is accomplished directly through the crankshafts 18 and 19 and the connecting rods 34a, which latter are provided with center bearings 51 respectively engaging a crankpin 52, to drive through cranks 53 and shafts 41. In this manner, this figure discloses six power take-offs.

In Figure 8, there is shown the stern of a boat (54) having an engine room 55 with engines 56 constructed in accordance with Figures 1 through 7, inclusive, arranged therein. Connected with crankshafts 18 and 19, are sternshafts 57, equipped with propellers diagrammatically illustrated at 58. With the form of the invention shown in Figures 2 and 7, it is also possible to drive auxiliary machinery 59 through the medium of shaft 41, or, vice versa, drive propellers from shaft 41, and auxiliary machinery through crankshafts 18 and 19.

In Figures 9, 10 and 11, the invention is shown in connection with the driving wheels of a railroad locomotive. These figures not only show the adaptability for railroad requirements, but also the very large concentration of power development in a very limited space, and the possibility of a direct drive without using an intermediate power supply, such as electricity, compressed air, or others.

In Figure 10, four engine housings 10 are shown grouped symmetrically around the axle 60 of a pair of driving wheels 61, and are suitably supported, preferably by ribs 62 and bearings 63 on axle 60, and thus form a unit of four power cylinders with eight power pistons for one pair of driving wheels.

Figure 9 shows how three such units, or twelve cylinders with twenty-four power pistons, between two driving wheels on one axle, may be employed. When more than one pair of driving wheels are to be supplied with power, these units may be connected with engine housings 10a, between two pairs of driving wheels, as shown in Fig. 11. Thus it is possible to supply power to four pairs of driving wheels from twenty-two cylinders, or forty-four power pistons, in one single bank of power units, or sixty-six cylinders with one hundred and thirty-two power pistons in three banks, as shown in Figures 9, 10 and 11. In Fig. 9, crankshafts 18 and 19 are shown as being provided with clutches 64, which may be employed to render gears 35 and 36 active or inactive, in a well-known manner, whenever desired.

For smaller power requirements when only one pair of driving wheels is to be driven, the cylinders may be arranged in the manner shown in Figs. 12, 13 and 14. In this form of the invention, the clutches 64a are provided on the axle or driven shaft 60.

In order to adapt this invention to the four-cycle process of operation, and also for the use of fuels consisting of mixtures of gas and air, an arrangement of valves as shown in Figs. 15 and 16, may be employed. In this adaption, the ports 23, 24 25 and 29 may be omitted, and a gas mixture inlet valve 65, and an exhaust valve 66 may be arranged to be operated by camshaft 38, gears 39 and 40, levers 42 and 43 pivoted on shaft 44 at 45. Obviously, gears 39 and 40 will be properly proportioned for the four-cycle process, in a manner well known in the arts. Also, the combustion chamber will be of a proper size, whereby the proper compression required for different gas mixtures will be obtained.

It is thought that the operation of this improved type of engine will be clearly understood from the foregoing specification, but, briefly stated, it is as follows:

As is well known, Diesel engines depend for the ignition of their fuel oil upon high temperatures raised by the compression of atmospheric air.

In Figs. 1 through 14, inclusive, an engine is depicted working on the two-cycle Diesel principle. Assuming now, for the sake of explanation, that the engine is started from a cold condition, and referring to Figs. 1 through 6, inclusive, that the left-hand piston 12 is in its extreme outer position, that is, in the outer dead center position, shown more clearly in Fig. 2, then the right-hand piston 13 will also be in its outer dead center position. In this position of the pistons 12 and 13 the power cylinder 11, the crankcases 21 and 22, the air storage chamber 26, the communicating spaces, the ports, the space between the pistons 12 and 13, and the combustion chamber are all filled with air of atmospheric pressure.

When starting the engine now by turning the crankshafts 18 or 19, the pistons 12 and 13 will move from their outer dead center position towards their inner dead center position, that is, towards each other, thereby closing the ports 25 and 29, and compressing the air between the two pistons 12 and 13, as shown in Fig. 1. This movement of pistons 12 and 13 towards the inner dead center will cause a partial vacuum in the crankcases 21 and 22. As soon as inlet ports 23 and 24 are opened by the outer ends 32 of pistons 12 and 13, new atmospheric air will enter through ports 23 and 24 into cylinder 11 and crankcases 21 and 22, increasing thereby the air pressure in the crankcases 21 and 22 from a partial vacuum to that of the atmospheric air outside of the engine.

After the pistons 12 and 13 have reached their inner dead center position, the air between the pistons 12 and 13 is sufficiently compressed and heated to ignite a jet of fuel oil forced through injector 37 into this highly compressed and heated air. The injector 37 receives the fuel oil through pipe 46 from some source of supply (not shown).

The ignition of the fuel oil by the compression heat between the pistons 12 and 13, is accompanied by a considerable rise in pressure, which will drive pistons 12 and 13 away from each other, and again towards their outer dead center position, and, at the same time, compress the air in the crankcases 21 and 22 as soon as inlet ports 23 and 24 are closed by the outer ends 32 of pistons 12 and 13. During the last stages of their movement towards the outer dead center position, the inner end 33 of piston 13 will open exhaust ports 29, and the inner end 33 of piston 12 will open the air ports 25, after the exhaust ports 29 have been already partially uncovered. This will permit reduction of exhaust pressure in cylinder 11 to atmospheric pressure, and scavenging will take place by fresh air through ports 25.

As has been stated before, the pistons 12 and 13, during their movement towards the outer dead center position, compress the air in crankcases 21 and 22, and as soon as this compression pressure is high enough, the air in the crankcases 21 and 22 will flow through valves 27 and 28 into the air storage chamber 26, from where this pre-compressed air may enter cylinder 11 between pistons 12 and 13, to be further compressed, to generate sufficient heat for the ignition of fuel oil.

After the pistons 12 and 13 have reached the outer dead center position, they are ready to start, again, the cycle of operation as explained above.

In the application of this invention to industrial and transportation purposes, it is to be noticed in Figs. 7 through 14, inclusive, that a great many variations of power take-offs are possible, by the proper use of gears, shafting and connecting rods. Moreover, in Figs. 9 through 14, examples are illustrated showing how the power take-offs may be arranged tangentially on the circumference of rotating wheels, thereby increasing considerably the torque on the wheels of a vehicle.

In the application of this invention to the four-cycle Diesel process, it is only necessary to omit the ports 23, 24, 25, 29, and the inlet valves 27 and 28, and to supply the inlet and outlet valves 65 and 66 with a gear and cam arrangement similar to that shown in Figs. 15 and 16. Gears 39 and 40 to be changed in the proper ratio well known in this art.

In the event that gas and air mixtures are to be used for combustion purposes, it is only necessary, if the four-cycle process of operation is to be used, to properly vary the ratio of gears 39 and 40, and to replace the injector 37 by a spark plug 67, and the ports 23, 24, 25, 29, and inlet valves 27 and 28 by inlet and outlet valves 65 and 66, as shown in Figs. 15 and 16.

In the event that greater quantities of air for supercharging purposes are required, then an air compressor, preferably of the rotary type and excess capacity, may be connected to the engine. This compressor then would build up the air pressure in the air storage chamber 26, being equipped with any suitable control mechanism, preferably that as shown in Patent 2,129,172.

While in Fig. 2 power may be taken off directly from the crankshafts 18 and 19, shaft 41, or the gears 35 and 36, clutches 64 may be used in connection with locomotives, boats or vehicles. Reverse motion can be accomplished either by reverse gears or double cams on camshaft 38 for forward or backward rotation of the engine.

In the form of the invention illustrated particularly in Figs. 8 to 14, inclusive, there is shown the application of power in very restricted spaces, such as is prescribed or required by the Master Car Builders Association, and other similar associations. At the present time, the power developed in internal combustion engines in locomotive service, is applied to secondary mechanism, such as electric current generators, air compressors, and similar mechanism, and the power thus developed is then transmitted through another medium of mechanism, such as electric motors or pneumatic cylinders, acting on the traction wheels of the locomotive. With the present invention, the large amount of power developed and necessary for modern locomotives, is concentrated, and applied directly through clutch mechanism to the traction wheels.

While the preferred forms of the invention have been herein shown and described, it is to be understood that various changes may be made in the details of construction and in the combination and arrangement of the several parts, within the scope of the claims, without departing from the spirit of this invention.

What is claimed as new is:

1. In an opposed piston engine, a pair of laterally spaced crankshafts, an engine cylinder intermediate the shafts, opposed pistons operating in the cylinder, means connecting the pistons with the respective proximate shaft, power take-off from said shafts, connecting means between said shafts, and additional power take-off means from said connecting means, intermediate said shafts, the said connecting means embodying a connecting rod, and the said additional power take-off means embodying a crankshaft to which said rod is connected.

2. In an opposed piston engine, a pair of spaced crankshafts, an engine cylinder intermediate said shafts, opposed pistons operating in said cylinder, means connecting the pistons respectively to the proximate shaft, power take-off means from said shafts, an additional crankshaft intermediate the first said shafts and independent of the pistons, a connection between the first of said shafts, a driving connection between the last said connection and the said intermediate crankshaft, whereby the intermediate crankshaft will be driven by the first said shafts, and a power take-off from the said intermediate crankshaft.

3. In an opposed piston engine, a pair of spaced crankshafts, an engine cylinder intermediate said shafts, opposed pistons operating in said cylinder, means connecting the pistons respectively to the proximate shaft, power take-off means from said shafts, an additional crankshaft intermediate the first said shafts and independent of the pistons, a connection between the first said shafts, a driving connection between the last said connection and the said intermediate crankshaft, whereby the intermediate crankshaft will be driven by the first said shafts, a power take-off from the said intermediate crankshaft, and bearings for an individual to the said crankshafts.

4. In an opposed piston engine, a pair of laterally spaced crankshafts, a cylinder intermediate said shafts, opposed pistons operating in said cylinder, means individual to the pistons for respectively operatively connecting them to one of said crankshafts, power take-off means individual to said shafts, additional power take-off means, separate from said shafts, and means responsive to the operation of said pistons for actuating the said additional power take-off means.

5. In an opposed piston engine, a pair of crankshafts, a cylinder between said shafts, opposed pistons operating in the cylinder, operative connections individual to each of the pistons and one of said shafts, a crank case, ports in said cylinder having communication with said crank case, means whereby atmospheric air may be admitted into the crank case to be compressed in the crank case and subsequently delivered into the cylinder between said pistons, through the said ports, the said ports being controlled by said pistons, means for producing an explosion of the compressed charge between said pistons, and means whereby the size of the explosion area may be varied.

6. In an opposed piston engine, a pair of crankshafts, a cylinder between said shafts, opposed pistons operating in the cylinder, operative connections individual to each of the pistons and one of said shafts, a crank case, ports in said cylinder having communication with said crank case, means whereby atmospheric air may be admitted into the crank case to be compressed in the crank case and subsequently delivered into the cylinder between said pistons, through the said ports, the said ports being controlled by said pistons, means for producing an explosion of the compressed charge between the pistons, and means whereby the explosion area may be varied while the degree of movement of the pistons remains constant.

7. In an opposed piston engine, a cylinder, opposed pistons operating in said cylinder, shafts actuated by said pistons, means for admitting a charge into the cylinder to be compressed between the pistons as said pistons reach the limit of their compression stroke towards each other, to form an explosion area therebetween, means for causing an explosion in said area, and means whereby said area may be varied while the extent of movement of said pistons towards each other remains constant.

8. In an opposed piston engine, a cylinder, opposed pistons operating in said cylinder, shafts actuated by said pistons, means for admitting a charge into the cylinder to be compressed between the pistons as said pistons reach the limit of their compression stroke towards each other, to form an explosion area therebetween, means for causing an explosion in said area, means whereby said area may be varied while the extent of movement of said pistons towards each other remains constant, and means for controlling the last said means.

9. In an opposed piston engine, a cylinder, opposed pistons operating in said cylinder, shafts actuated by said pistons, means for admitting a charge into the cylinder to be compressed between the pistons as said pistons reach the limit of their compression stroke towards each other, to form an explosion area therebetween, means for causing an explosion in said area, means whereby said area may be varied while the extent of movement of said pistons towards each other remains constant, the last said means embodying a supplemental cylinder having communication with the first said cylinder, and a piston operating in said supplemental cylinder.

10. In an opposed piston engine, a cylinder, opposed pistons operating in said cylinder, shafts actuated by said pistons, means for admitting a charge into the cylinder to be compressed between the pistons as said pistons reach the limit of their compression stroke towards each other, to form an explosion area therebetween, means for causing an explosion in said area, means whereby said area may be varied while the extent of movement of said pistons towards each other remains constant, the last said means embodying a supplemental cylinder having communication with the first said cylinder, a piston operating in said supplemental cylinder, and means for controlling the operation of the last said piston.

11. In an opposed piston engine, a cylinder, opposed pistons operating in said cylinder, shafts actuated by said pistons, means for admitting a charge into the cylinder to be compressed between the pistons as said pistons reach the limit of their compression stroke towards each other, to form an explosion area therebetween, means for causing an explosion in said area, means whereby said area may be varied while the extent of movement of said pistons towards each other remains constant, the last said means embodying a supplemental cylinder having communication with the first said cylinder, a piston operating in said supplemental cylinder, and fluid pressure actuated means for controlling the operation of the last said piston.

12. In an opposed piston engine, a pair of spaced crankshafts, a cylinder between the shafts, opposed pistons operating in said cylinder, an operative connection between each of the pistons and one of said shafts, means whereby atmospheric air may be admitted into the crank cases to be compressed therein by the pistons and subsequently delivered from said crank cases into the cylinder between the pistons, to be further compressed by the pistons, said crank cases forming compression chambers, a portion of which chambers encompasses said cylinder, means whereby the compressed charge between the pistons may be exploded, ports and passages between the compression chambers and said cylinder, said ports and passages being controlled by said pistons, power take-off means from said shafts, and additional power take-off means other than said shafts.

13. In an opposed piston engine, a plurality of power units, each unit embodying spaced crankshafts, a cylinder intermediate said shafts, opposed pistons operating in each cylinder, an operative connection between each piston and one of said shafts, means for supplying and compressing a charge between the respective pairs of pistons, means for exploding said charge, power take-off means individual to the shafts, and a driven element common to said power take-off means, said power take-off means being disposed to apply power tangentially to said driven element, at spaced points about its circumference.

14. In an opposed piston engine, a plurality of power units, each unit embodying spaced crankshafts, a cylinder intermediate said shafts, opposed pistons operating in each cylinder, an operative connection between each piston and one of said shafts, means for supplying and compressing a charge between the respective pairs of pistons, means for exploding said charge, power take-off means individual to the shafts, and a driven element common to said power take-off means, said power take-off means being disposed to apply power tangentially to said driven element, at spaced points about its circumference, said driven element embodying a gear, and said power take-off means also embodying gears meshing with the first said gear.

15. In an opposed piston engine, a plurality of power units, each unit embodying spaced crankshafts, a cylinder intermediate said shafts, opposed pistons operating in each cylinder, an operative connection between each piston and one of said shafts, means for supplying and compressing a charge between the respective pairs of pistons, means for exploding said charge, power take-off means individual to the shafts, and a driven element common to said power take-off means, said power take-off means being disposed to apply power tangentially to said driven element, at spaced points about its circumference, one of the pistons of each of said units being operatively connected to the same shaft.

16. An opposed piston engine embodying two pairs of crankshafts, said pairs being superposed, a driven shaft intermediate said pairs, cylinders between which said driven shaft is disposed, opposed pistons in said cylinders, operative connections between said pistons and the respective adjacent crankshafts, direct operative connections between said driven shaft and all of said crankshafts and embodying power controlling clutch devices individual to the crankshafts, and means whereby fuel may be supplied to said cylinders intermediate the respective opposed pistons.

17. An opposed piston engine embodying two pairs of crankshafts, said pairs being superposed, a driven shaft intermediate said pairs, cylinders between which said driven shaft is disposed, opposed pistons in said cylinders, operative connections between said pistons and the respective adjacent crankshafts, operative connections between said driven shaft and all of said crankshafts, means whereby fuel may be supplied to said cylinders intermediate the respective opposed pistons, and means whereby the size of the explosion space may be varied.

18. An opposed piston engine embodying two pairs of crankshafts, said pairs being superposed and spaced from each other, the respective shafts of each pair being also spaced from each other, a plurality of cylinders, one of said cylinders being disposed between the proximate shafts of adjacent shafts of said pairs of shafts, opposed pistons in each of said cylinders, an operative connection between each of said crankshafts and two of said pistons, a driven element between said crankshafts, and an operative connection between said crankshafts and said driven element, said cylinders encompassing said driven element.

19. In combination, a plurality of pairs of superposed spaced crankshafts, the shafts of each pair being laterally spaced, a cylinder disposed between the shafts of each pair, opposed pistons in each cylinder, cylinders disposed between the respective shafts of the superposed pairs of shafts, opposed pistons in the last said cylinders, additional cylinders disposed adjacent certain of said crankshafts, a piston operating in each of the last said cylinders, operative connections between all of the pistons and the respective adjacent crankshafts, and a driven element operatively connected with said crankshafts.

20. In combination, a plurality of pairs of superposed spaced crankshafts, the shafts of each pair being laterally spaced, a cylinder disposed between the shafts of each pair, opposed pistons in each cylinder, cylinders disposed between the respective shafts of the superposed pairs of shafts, opposed pistons in the last said cylinders, additional cylinders disposed adjacent certain of said crankshafts, a piston operating in each of the last said cylinders, operative connecadjacent crankshafts, and a driven element operatively connected with said crankshafts, each of said crankshafts being operatively connected to at least three of said pistons.

21. In combination, a plurality of pairs of superposed spaced crankshafts, the shafts of each pair being laterally spaced, a cylinder disposed between the shafts of each pair, opposed pistons in each cylinder, cylinders disposed between the respective shafts of the superposed pairs of shafts, opposed pistons in the last said cylinders, additional cylinders disposed adjacent certain of said crankshafts, a piston operating in each of the last said cylinders, operative connections between all of the pistons and the respective adjacent crankshafts, a driven element operatively connected with said crankshafts, means whereby an explosive charge may be admitted to the cylinders between the pistons, and means for exploding said charge.

22. In combination, a plurality of pairs of superposed spaced crankshafts, the shafts of each pair being laterally spaced, a cylinder disposed between the shafts of each pair, opposed pistons in each cylinder, cylinders disposed between the respective shafts of the superposed pairs of shafts, opposed pistons in the last said cylinders, additional cylinders disposed adjacent certain of said crankshafts, a piston operating in each of the last said cylinders, operative connections between all of the pistons and the respective adjacent crankshafts, a driven element operatively connected with said crankshafts, means whereby an explosive charge may be admitted to the cylinders between the pistons, means for exploding said charge, and means whereby the size of the explosion space may be varied.

23. In combination, a plurality of pairs of superposed spaced crankshafts, the shafts of each pair being laterally spaced, a cylinder disposed between the shafts of each pair, opposed pistons in each cylinder, cylinders disposed between the respective shafts of the superposed pairs of shafts, opposed pistons in the last said cylinders, additional cylinders disposed adjacent certain of said crankshafts, a piston operating in each of the last said cylinders, operative connections between all of the pistons and the respective adjacent crankshafts, a driven element, and means operatively connecting certain of said crankshafts with said driven element, the last recited means embodying a clutch device.

24. A motor unit embodying a plurality of superposed spaced crankshafts, cylinders between the shafts of each pair and also between the respective shafts of the superposed pairs, opposed pistons in each of the cylinders, operative connections between the pistons and the respective adjacent crankshafts, said shafts being connected to at least two of said pistons, a driven element, operative connections between said crankshafts and said driven element, coupling means between a plurality of said units for coupling them together, the last said means embodying a cylinder, a piston in the last said cylinder, and an operative connection between the last said piston and one of said crankshafts.

25. A motor unit embodying a plurality of superposed spaced crankshafts, cylinders between the shafts of each pair and also between the respective shafts of the superposed pairs, opposed pistons in each of the cylinders, operative connections between the pistons and the respective adjacent crankshafts, said shafts being connected to at least two of said pistons, a driven element, operative connections between said crankshafts and said driven element, coupling means between a plurality of said units for coupling them together, the last said means embodying a cylinder, a piston in the last said cylinder, an operative connection between the last said piston and one of said crankshafts, and means whereby an explosive charge may be admitted into certain of said cylinders between the pistons therein.

26. A motor unit embodying a plurality of superposed spaced crankshafts, cylinders between the shafts of each pair and also between the respective shafts of the superposed pairs, opposed pistons in each of the cylinders, operative connections between the pistons and the respective adjacent crankshafts, said shafts being connected to at least two of said pistons, a driven element, operative connections between said crankshafts and said driven element, coupling means between a plurality of said units for coupling them together, the last said means embodying a cylinder, a piston in the last said cylinder, an operative connection between the last said piston and one of said crankshafts, means whereby an explosive charge may be admitted into certain of said cylinders between the pistons therein, and means whereby the size of the explosion space may be varied.

27. An internal combustion engine embodying a cylinder, opposed pistons operable in the cylinder, means for admitting an explosive charge into the cylinder between the pistons, and means whereby the size of the explosion space between the pistons may be varied.

28. Means for applying directly to the drive shaft of a driving mechanism the power created by an internal combustion engine, embodying a plurality of cylinders arranged around the drive shaft, opposed pistons in each cylinder, a shaft driven by each piston, and a direct connection between each of said shafts and the drive shaft, the said connection embodying a clutch device controllable at will.

GUSTAV R. GEHRANDT.

REFERENCES CITED

The following references are of record in the file of this patent:

UNITED STATES PATENTS

| Number | Name | Date |
|---|---|---|
| Re. 17,218 | Kasley | Feb. 19, 1929 |
| 634,067 | Plass | Oct. 3, 1899 |
| 808,336 | Bogert | Dec. 26, 1905 |
| 1,091,427 | DeLukacsevics | Mar. 24, 1914 |
| 1,213,841 | Cooke et al. | Jan. 30, 1917 |
| 1,324,520 | Robins | Dec. 9, 1919 |
| 1,387,438 | Dillig | Aug. 9, 1921 |
| 1,455,787 | Herr | May 22, 1923 |
| 1,578,476 | Slaght | Mar. 30, 1926 |
| 1,652,266 | Barletta | Dec. 13, 1927 |
| 1,662,828 | Law | Mar. 20, 1928 |
| 1,701,360 | Causan | Feb. 5, 1929 |
| 1,889,946 | Cadwell | Dec. 6, 1932 |
| 2,205,675 | Shirley | June 25, 1940 |
| 2,387,843 | Gray | Oct. 30, 1945 |

FOREIGN PATENTS

| Number | Country | Date |
|---|---|---|
| 705,951 | France | 1931 |